Patented May 11, 1954

2,678,336

UNITED STATES PATENT OFFICE 2,678,336

2-(4-CHLORO-o-TOLOXY)ETHANOL

Dalton B. McCaskey, Midland, Mich., assignor to
The Dow Chemical Company, Midland, Mich.,
a corporation of Delaware No Drawing. Application December 20, 1951,
Serial No. 262,655

1 Claim. (Cl. 260—613)

This invention is directed to 2-(4-chloro-o-toloxy)ethanol having the formula

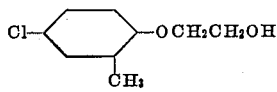

This new compound is a crystalline solid, soluble in many organic liquids and substantially insoluble in water. It is adapted to be employed as a modifier in plastic compositions, as a special purpose solvent, as a toxic ingredient in plant growth control compositions and as an intermediate for the preparation of more complex organic compounds.

The new compound may be prepared by reacting an alkali metal 4-chloro-o-cresolate with an ethylene halohydrin. In practice, the cresolate employed is preferably the sodium salt and may be prepared by reacting substantially equimolecular proportions of sodium hydroxide and 4-chloro-o-cresol in an aqueous medium. The resulting cresolate may then be reacted with a substantially equimolecular proportion of ethylene halohydrin to obtain the desired substituted ethanol product. In carrying out the reaction, good results have been obtained when employing a slight molecular excess of the ethylene halohydrin.

The reaction between the cresolate and the ethylene halohydrin is conveniently accomplished by adding the latter portionwise to an aqueous solution of the cresolate, with stirring, and at a temperature of from about 70° to 100° C. The reaction mixture is thereafter maintained at a temperature of 90° to 110° C. for a period of time to complete the reaction. Upon completion of the reaction, the 2-(4-chloro-o-toloxy)ethanol product may be separated by conventional methods, such as by washing with water, decantation and fractional distillation.

In a representative preparation, 360 grams (9 moles) of sodium hydroxide was dissolved in 1.8 liters of water and 1283 grams (9 moles) of 4-chloro-o-cresol was dispersed therein with stirring. The resulting aqueous solution of sodium 4-chloro-o-cresolate was adjusted to a temperature of 70° C. and 805 grams (10 moles) of ethylene chlorohydrin added thereto in a steady stream with vigorous agitation. The reaction mixture was then heated under reflux for a period of 6 hours. Upon completion of the reaction, the mixture was cooled, diluted with water and extracted with benzene. The benzene layer was separated and fractionally distilled through an 8 inch Vigreux column to recover the benzene. The distillation was thereupon continued under reduced pressure to obtain the 2-(4-chloro-o-toloxy)-ethanol product as a colorless oil, boiling at 115°–119° C. under 1 millimeter pressure. Upon standing, this product crystallized as a white solid, which was found to melt at 51°–53° C.

I claim:
2-(4-chloro-o-toloxy)ethanol.

References Cited in the file of this patent

UNITED STATES PATENTS

| Number | Name | Date |
|---|---|---|
| 2,451,149 | Boehm | Oct. 12, 1948 |

OTHER REFERENCES

Boyd et al., Jour. Chem. Soc. (British), vol. 105, pp. 2117–2139 (1914).

Nair et al., Jour. Indian Chem. Soc., vol. 12, pp. 318–21 (1935). Abstracted in Chemical Abstracts, vol. 29, p. 6881 (1935).

Becher et al., Monatsheffte für Chemie, vol. 77, pp. 80–85 (1947).